United States Patent
Li et al.

(10) Patent No.: US 10,144,803 B2
(45) Date of Patent: Dec. 4, 2018

(54) METHOD OF PREPARING HYPERBRANCHED POLYETHER ESTER

(71) Applicant: Jiangnan University, Wuxi (CN)

(72) Inventors: Xiaojie Li, Wuxi (CN); Xingliang Liu, Wuxi (CN); Jing Luo, Wuxi (CN); Xiaoya Liu, Wuxi (CN); Mingqing Chen, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 15/559,427

(22) PCT Filed: Apr. 17, 2017

(86) PCT No.: PCT/CN2017/080747
§ 371 (c)(1),
(2) Date: Sep. 19, 2017

(87) PCT Pub. No.: WO2017/193767
PCT Pub. Date: Nov. 16, 2017

(65) Prior Publication Data
US 2018/0194893 A1     Jul. 12, 2018

(30) Foreign Application Priority Data
May 12, 2016   (CN) .......................... 2016 1 0310877

(51) Int. Cl.
C08G 63/02      (2006.01)
C08G 63/664     (2006.01)
C08G 63/682     (2006.01)
C08G 63/78      (2006.01)
C08G 83/00      (2006.01)
C08G 63/81      (2006.01)

(52) U.S. Cl.
CPC ......... *C08G 63/664* (2013.01); *C08G 63/682* (2013.01); *C08G 63/78* (2013.01); *C08G 63/81* (2013.01); *C08G 83/008* (2013.01)

(58) Field of Classification Search
USPC ........................................ 528/206, 271, 272
See application file for complete search history.

(56) References Cited

FOREIGN PATENT DOCUMENTS

| CN | 1296985 A | 5/2001 |
|---|---|---|
| CN | 101381454 A | 3/2009 |
| CN | 102372846 A | 3/2012 |
| CN | 103387659 A | 11/2013 |
| CN | 105860040 A | 8/2016 |

*Primary Examiner* — Terressa Boykin
(74) *Attorney, Agent, or Firm* — Gokalp Bayramoglu

(57) ABSTRACT

The present invention relates to a method of preparing a hyperbranched polyether ester. According to the present invention, a di-functionality haloalkane and a tri-functionality hydroxyl/carboxyl benzene are used as raw materials, and the hyperbranched polyether ester is synthetized in one pot with an $A_2+B_3$ polymerization method. The present invention is featured by easily obtained raw materials and simple steps, and the prepared hyperbranched polyether ester contains end groups with high reactive activity, so that various functional groups or polymer chains can be introduced into the hyperbranched polyether ester by a further condensation reaction, ring-opening reaction, etc., and thus a hyperbranched polymer with a diversity of properties and unique functions can be prepared.

10 Claims, 1 Drawing Sheet

METHOD OF PREPARING HYPERBRANCHED POLYETHER ESTER

CROSS REFERENCE TO RELATED APPLICATIONS

This application is the national phase entry of International Application No. PCT/CN2017/080747, filed on Apr. 17, 2017, which is based upon and claims priority to Chinese Patent Application No. CN201610310877.X, filed on May 12, 2016, the entire contents of which are incorporated herein by reference.

TECHNICAL FIELD

The present invention relates to a method of preparing a hyperbranched polyether ester, and belongs to the field of organic macromolecules.

BACKGROUND

Quite different from the traditional linear polymer in structure, the dendritic polymer has a highly-ordered three-dimensional structure, consists of an initiator core, an inner-layer repeating unit and an outer-layer end group, and is featured by a high degree of geometric symmetry, a precise molecular structure, as well as a large number of surface functional groups and internal cavities. However, it often takes an extremely long time to prepare a perfect dendritic polymer, so that the application of the dendritic polymer is limited, and the dendritic polymer is generally quite high in price due to the difficulty in preparation. Compared to the dendritic polymer, the hyperbranched polymer has an irregular three-dimensional quasi-spherical structure, the molecule contains a part of linear structural units, and the functional group is partially located on the surface of the molecule and partially present inside of the molecule; the hyperbranched polymer has a wide molecular weight distribution and a degree of branching between 0 and 1. Although the hyperbranched polymer is not as perfect as the dendritic polymer in structure, the physical and chemical properties of the hyperbranched polymer are very similar to those of the dendritic polymer, such as a good solubility, a small solution and melt viscosity, and a plurality of end functional groups and intramolecular voids. Besides, the hyperbranched polymer also has its own advantages, for example, the synthesis process is simple, and it can be synthesized in one step. It is entirely possible that, the hyperbranched polymer can replace the dendritic polymer in aspects, such as a drug carrier and a polymer catalyst, a curing agent, a solvent-free coating and a polymer processing aid for development and application.

Up to now, there are mainly four preparation methods for the hyperbranched polymer, that is, condensation polymerization reaction, addition polymerization reaction, self-condensing vinyl polymerization (SCVP) and ring-opening polymerization. Particularly, the most mature method is that, the hyperbranched polymer is prepared by condensation polymerization reactions of $AB_2$ type monomers, and the method has universality and practicability. However, the $AB_2$ type monomer has not currently been commercialized yet, and the only several types of $AB_2$ monomer on the market are not sufficient to meet all the demands, and preparing the hyperbranched polymer by polymerization reactions of $A_2+B_3$ type monomers has attracted people's attention. Since $A_2$ reacts with $B_3$, gelation reaction easily occurs in the preparation process, and it is necessary to control the reaction by controlling the reaction time, the reaction proportion and the reaction temperature.

Currently, there is a rare case where main chains of polyether ester hyperbranched polymers contain rigid aromatic groups and flexible aliphatic alkyl chains simultaneously. However, such a unique combination often brings many distinctive properties to the polymer. If the hyperbranched polymer contains a large number of aromatic groups, excessively strong rigidity will lead to a large space steric effect, thereby significantly reducing its usability. The rigidity and flexibility of the hyperbranched polymer can be well regulated by introducing aromatic groups and aliphatic chains into the hyperbranched polymer at the same time. The presence of the flexible segment can effectively reduce the space steric effect and make the effect more efficient; while the rigid groups in the backbone can improve the glass transition temperature (Tg) greatly, and provide excellent processing and mechanic properties.

SUMMARY

Technical Problem

The present invention relates to a method of preparing a hyperbranched polyether ester, and can be applied to various aspects, such as application research on an adhesive and a flexibilizer, polymer blending modification, epoxy resin curing agent and toughening agent field, preparation of a hydrogel, preparation of a porous membrane, a photo-curing coating, functional coating layer and other fields.

Solution

Technical Solution

A hyperbranched polyether ester is characterized in that, the polymer is terminated by reactive groups such as phenolic hydroxyl group, carboxyl group or haloalkyl, and has a number average molecular weight of 5~20 KDa, a polydispersity index of 1.3~2, and a degree of branching of 0.5~0.8; the structure of the hyperbranched polyether ester is as follows:

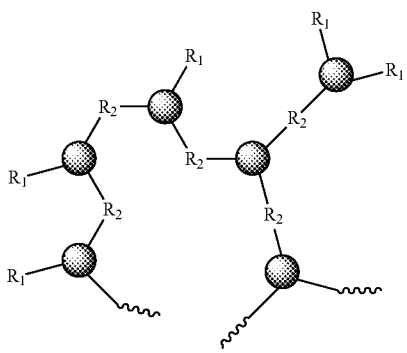

$R_1$ = COOH or OH or ─$(CH_2)_n$─X   X = Br or Cl $R_2$ = ─$(CH_2)_n$─   n = 2,3,4,5,6,7,8,9,10

-continued

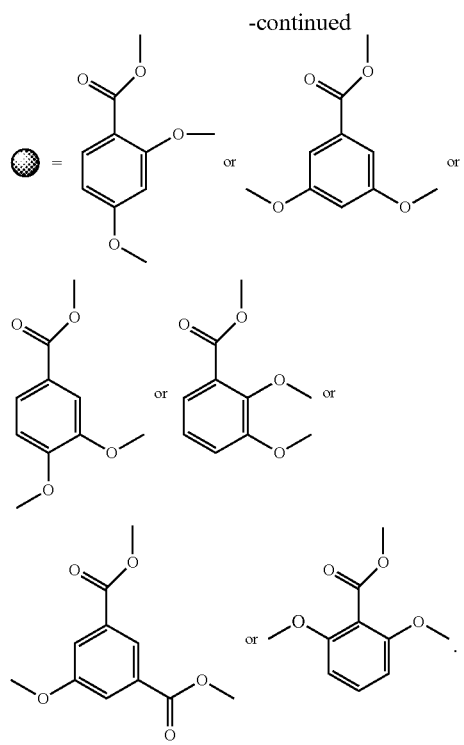

The method of preparing a hyperbranched polyether ester without a central core molecule in one pot particularly including steps as follows: adding the tri-functionality hydroxyl/carboxyl benzene (1 mol), the di-functionality haloalkane (0.75~3 mol), an acid-binding agent (1.5~7.2 mol), and a solvent (0.1~1 g/mL) into a reactor in one portion to react under 20~100° C. for 4~96 h; after the completion of the reaction, adding an inorganic acid for acidification, and filtering out the precipitate to obtain filtrate; precipitating and purifying the filtrate in a precipitant and drying to obtain a colorless or faint yellow viscous solid.

The method of preparing a hyperbranched polyether ester without a central core molecule in one pot is characterized in that, the tri-functionality hydroxyl/carboxyl benzene is selected from one of: 3,5-dihydroxybenzoic acid, 2,4-dihydroxybenzoic acid, 3,4-dihydroxy benzoic acid, 2,6-dihydroxy benzoic acid, 2,3-dihydroxy benzoic acid and 5-hydroxyisophthalic acid.

The method of preparing a hyperbranched polyether ester without a central core molecule in one pot is characterized in that, the di-functionality haloalkane is selected from one of: 1,10-dibromodecane, 1,2-dibromoethane, 1,6-dibromohexane, 1,12-dibromododecane, 1,11-dibromoundecane, 1,9-dibromononane, 1,7-dibromoheptane, 1,8-dibromooctane, 1,5-dibromopentane, 1,4-dibromobutane, 1,3-dibromopropane, 1,10-dichlorodecane, 1,2-dichloroethane, 1,6-dichlorohexane, 1,12-dichlorododecane, 1,11-dichloroundecane, 1,9-dichlorononane, 1,7-dichloroheptane, 1,8-dichlorooctane, 1,5-dichloropentane, 1,4-dichlorobutane, and 1,3-dichloropropane.

The method of preparing a hyperbranched polyether ester without a central core molecule in one pot is characterized in that, the acid-binding agent is selected from one of: sodium carbonate, potassium carbonate and sodium hydroxide.

The method of preparing a hyperbranched polyether ester without a central core molecule in one pot is characterized in that, the solvent is selected from one of: 1,4-dioxane, tetrahydrofuran, N,N'-dimethylformamide, N,N'-dimethylacetamide and N-methyl-pyrrolidone.

The method of preparing a hyperbranched polyether ester without a central core molecule in one pot is characterized in that, the inorganic acid is selected from one of: hydrochloric acid, sulfuric acid and nitric acid.

The method of preparing a hyperbranched polyether ester without a central core molecule in one pot is characterized in that, the precipitant is selected from one of: deionized water, anhydrous diethyl ether, petroleum ether, ethanol and deionized water mixed in equal ratios, methanol and deionized water mixed in equal ratios, and diethyl ether and petroleum ether mixed in equal ratios.

The method of preparing a hyperbranched polyether ester with a central core molecule in one pot particularly includes steps as follows: adding the tri-functionality hydroxyl/carboxyl benzene (1 mol), the di-functionality haloalkane (0.75~3 mol), an acid-binding agent (1.5~7.2 mol), a central "core molecule" (0.012~0.024 mol), and a solvent (0.1~1 g/mL) into a reactor in one portion to react under 20~100° C. for 4~96 h; after the completion of the reaction, adding an inorganic acid for acidification, and filtering out the precipitate to obtain filtrate; precipitating and purifying the filtrate in a precipitant and drying to obtain a colorless or faint yellow viscous solid.

The method of preparing a hyperbranched polyether ester with a central core molecule in one pot is characterized in that, the central "core molecule" is selected from one of: 1,3,5-benzene tricarboxylic acid, phloroglucinol, 1,3,5-benzene trimethanol; the remaining selections for the ternary phenolic hydroxyl and carboxyl group-containing compound, the di-functionality haloalkane, the acid-binding agent, the solvent, the inorganic acid and the precipitant are the same as the hyperbranched polyether ester prepared without a central core molecule in one pot.

Beneficial Effects of the Present Invention

Beneficial Effects

Advantages of the present invention are as follows:

1. The hyperbranched polyether ester with controllable active end groups is prepared with a one-pot method in the present invention, the synthesis raw materials are easy to obtain, the synthesis method is simple, and the yield is high.

2. The hyperbranched polyether ester prepared according to the present invention has a very high selective activity, so that a polymer containing a large number of ether bonds and ester bonds is obtained, and the molecular weight and the branching degree of the product are relatively high and can be controlled; compared to a traditional method, the inventive method has unique advantages of not easily forming a gel, simple and easy-to-use operations, high controllability and the like.

DETAILED DESCRIPTION

Embodiments of the Present Invention

Figure 1:
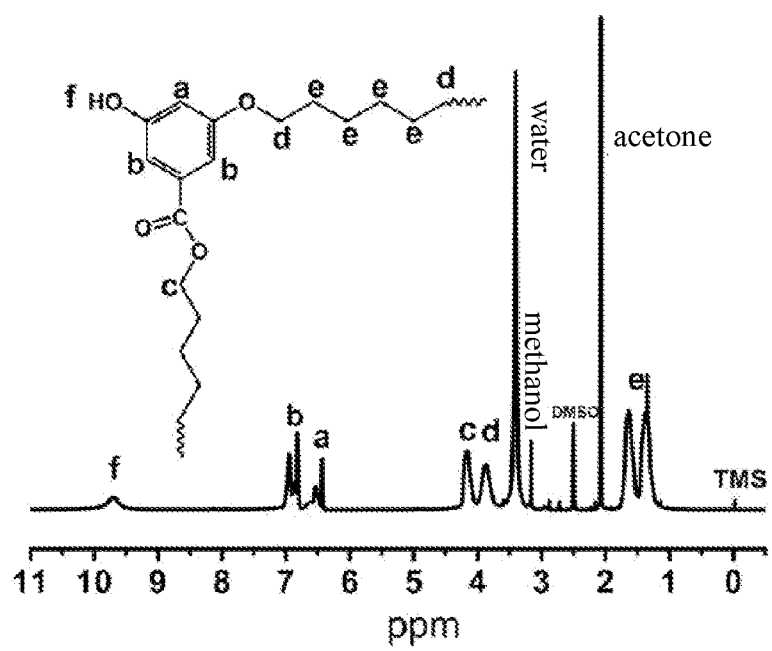
FIG. 1 is a $^1$H nuclear magnetic resonance spectrum of a hyperbranched polyether ester.
Figure 2:
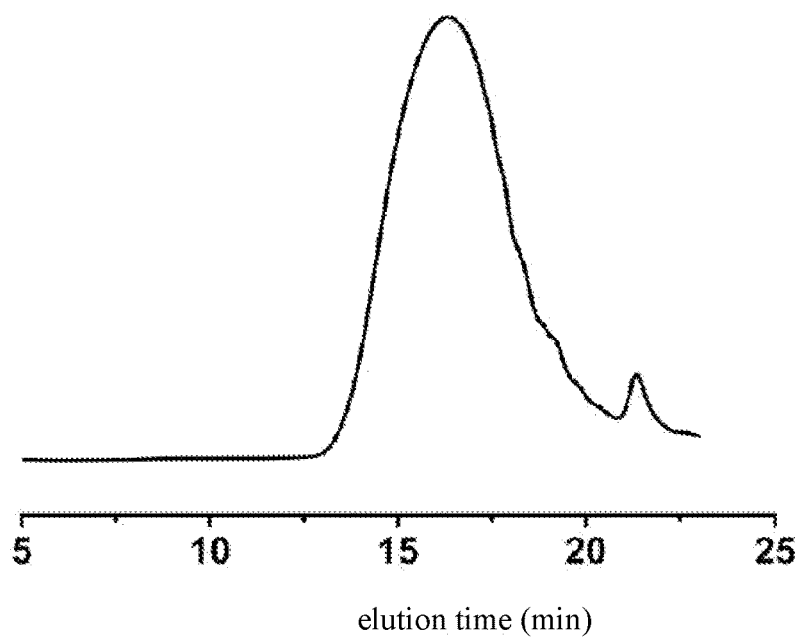
FIG. 2 is gel permeation chromatogram of a hyperbranched polyether ester with tetrahydrofuran as a mobile phase.

Hereinafter, the present invention will be explained in more detail with reference to the specific embodiments. It should be understood that the present invention is not limited to the following embodiments, and the methods are all considered to be conventional methods unless otherwise indicated. The materials all can be commercially and publicly available unless otherwise indicated.

Embodiments 1 to 15 are preparation cases of polyether ester type hyperbranched polymer with phenolic hydroxyl group as an end group.

Embodiment 1

10.0 g (0.065 mol) of 3,5-dihydroxybenzoic acid, 53.9 g (0.39 mol) of an acid-binding agent potassium carbonate, 31.6 g (0.13 mol) of 1,6-dibromohexane are added into a reactor simultaneously, and dissolved with 83.2 mL of N,N'-dimethylformamide; the reaction is warmed to 20° C. for 96 h; after the completion of the reaction, an inorganic acid is added for acidification, and the precipitate is filtered out to obtain filtrate; the filtrate is precipitated with a precipitant which is mixed with ethanol and deionized water in equal volumes, and dried for 24 h to obtain 8.6 g of a faint yellow solid in 86% yield.

Embodiment 2

In the preparation process of the hyperbranched polyether ester without a central core molecule in one pot, this embodiment is the same as Embodiment 1, except that the raw material, 10.0 g (0.065 mol) of 3,5-dihydroxybenzoic acid is replaced with 10.0 g (0.065 mol) of 3,4-dihydroxybenzoic acid.

Embodiment 3

In the preparation process of the hyperbranched polyether ester without a central core molecule in one pot, this embodiment is the same as Embodiment 1, except that the raw material, 10.0 g (0.065 mol) of 3,5-dihydroxybenzoic acid is replaced with 10.0 g (0.065 mol) of 2,6-dihydroxybenzoic acid.

Embodiment 4

In the preparation process of the hyperbranched polyether ester without a central core molecule in one pot, this embodiment is the same as Embodiment 1, except that the raw material, 10.0 g (0.065 mol) of 3,5-dihydroxybenzoic acid is replaced with 10.0 g (0.065 mol) of 2,3-dihydroxybenzoic acid.

Embodiment 5

In the preparation process of the hyperbranched polyether ester without a central core molecule in one pot, this embodiment is the same as Embodiment 1, except that the raw material, 10.0 g (0.065 mol) of 3,5-dihydroxybenzoic acid is replaced with 10.0 g (0.065 mol) of 5-hydroxyisophthalic acid.

Embodiment 6

In the preparation process of the hyperbranched polyether ester without a central core molecule in one pot, this embodiment is the same as Embodiment 1, except that the raw material, 10.0 g (0.065 mol) of 3,5-dihydroxybenzoic acid is replaced with 10.0 g (0.065 mol) of 2,4-dihydroxybenzoic acid.

Embodiment 7

In the preparation process of the hyperbranched polyether ester without a central core molecule in one pot, this embodiment is the same as Embodiment 1, except that the raw material, 31.6 g (0.13 mol) of 1,6-dibromohexane is replaced with 28.1 g (0.13 mol) of 1,4-dibromobutane.

Embodiment 8

In the preparation process of the hyperbranched polyether ester without a central core molecule in one pot, this embodiment is the same as Embodiment 1, except that the raw material, 31.6 g (0.13 mol) of 1,6-dibromohexane is replaced with 29.9 g (0.13 mol) of 1,5-dibromopentane.

Embodiment 9

In the preparation process of the hyperbranched polyether ester without a central core molecule in one pot, this embodiment is the same as Embodiment 1, except that the raw material, 31.6 g (0.13 mol) of 1,6-dibromohexane is replaced with 37.2 g (0.13 mol) of 1,9-dibromononane.

Embodiment 10

In the preparation process of the hyperbranched polyether ester without a central core molecule in one pot, this embodiment is the same as Embodiment 1, except that the raw material, 31.6 g (0.13 mol) of 1,6-dibromohexane is replaced with 37.2 g (0.13 mol) of 1,9-dichlorononane.

Embodiment 11

In the preparation process of the hyperbranched polyether ester, this embodiment is the same as Embodiment 1, except that the raw material, 83.2 mL of N,N'-dimethylformamide is replaced with 83.2 mL of N,N'-dimethylacetamide.

Embodiment 12

In the preparation process of the hyperbranched polyether ester without a central core molecule in one pot, this embodiment is the same as Embodiment 1, except that the reaction time 96 h is replaced with 48 h.

Embodiment 13

In the preparation process of the hyperbranched polyether ester without a central core molecule in one pot, this embodiment is the same as Embodiment 1, except that 53.9 g (0.39 mol) of the acid-binding agent potassium carbonate is replaced with 15.6 g (0.39 mol) of the acid-binding agent sodium hydroxide.

Embodiment 14

10.0 g (0.065 mol) of 2,4-dihydroxybenzoic acid 53.9 g (0.39 mol) of an acid-binding agent potassium carbonate, 31.6 g (0.13 mol) of 1,6-dibromohexane, 0.33 g (0.002 mol) of a central "core molecule" 1,3,5-benzene tricarboxylic acid are added into a reactor simultaneously, and dissolved with 83.2 mL of N,N'-dimethylformamide; the reaction is warmed to 100° C. for 96 h; after the completion of the reaction, an inorganic acid is added for acidification, and the precipitate is filtered out to obtain filtrate; the filtrate is precipitated with a precipitant which is mixed with ethanol and deionized water in equal volumes, and dried for 24 h to obtain 8.3 g of a faint yellow solid in 83% yield.

Embodiment 15

In the preparation process of the hyperbranched polyether ester with a central core molecule in one pot, this embodiment is the same as Embodiment 14, except that 0.33 g (0.002 mol) of the central "core molecule" 1,3,5-benzene tricarboxylic acid is replaced with 0.33 g (0.002 mol) of a central "core molecule" 1,3,5-benzene trimethanol.

What is claimed is:

1. A method of preparing a hyperbranched polyether ester, comprising the following steps:
   using di-functionality haloalkane and tri-functionality hydroxyl/carboxyl benzene as raw materials, and
   synthetizing hyperbranched polyether ester with/without a central core molecule in one pot and with an $A_2+B_3$ polymerization method;
   wherein the hyperbranched polymer ester is terminated by reactive groups including phenolic hydroxyl group, carboxyl group or haloalkyl, wherein the hyperbranched polymer ester has a number-average molecular weight of 5~20 KDa, a polydispersity index of 1.3~2, and a degree of branching of 0.5~0.8; wherein a structure of the hyperbranched polyether ester is as follows:

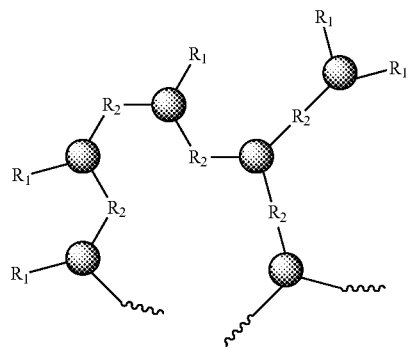

$R_1$ = COOH or OH or —$(CH_2)_n$—X   X = Br or Cl
$R_2$ = —$(CH_2)_n$—   n = 2,3,4,5,6,7,8,9,10

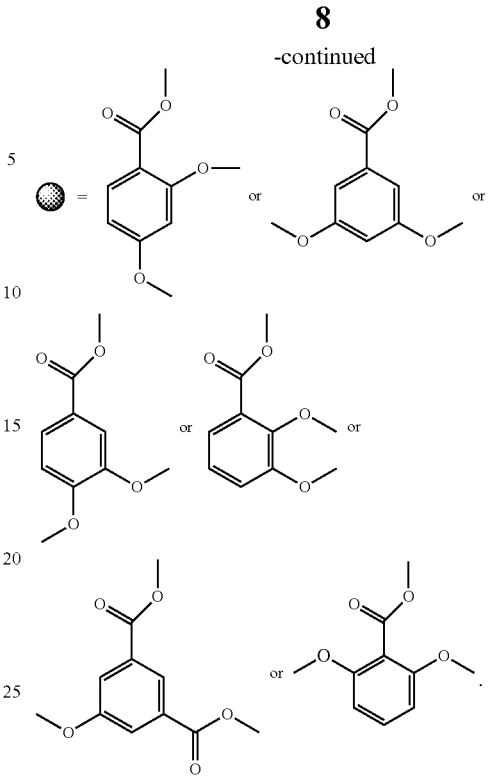

2. The method of preparing a hyperbranched polyether ester according to claim 1, wherein the hyperbranched polyether ester is synthetized without a central core molecule in one pot, comprising steps as follows:
   adding reactants comprising the tri-functionality hydroxyl/carboxyl benzene, the di-functionality haloalkane, an acid-binding agent, and a solvent into a reactor at one time,
   reacting under 20~100° C. for 4~96 h,
   adding an inorganic acid for acidification after the reaction to obtain a solution,
   filtering out a precipitate of the solution to obtain a filtrate,
   precipitating and purifying the filtrate in a precipitant, and drying to obtain a viscous solid colorless or in faint yellow;
   wherein an amount of the tri-functionality hydroxyl/carboxyl benzene is 1 mol, an amount of the di-functionality haloalkane is 0.75-3 mol, an amount of the acid-binding agent is 1.5-7.2 mol, and an amount of the solvent is 0.1-1 mol.

3. The method of preparing a hyperbranched ester according to claim 2, wherein the tri-functionality hydroxyl/carboxyl benzene is selected from the group consisting of: 3,5-dihydroxy benzoic acid, 2,4-dihydroxy benzoic acid, 3,4-dihydroxy benzoic acid, 2,6-dihydroxy benzoic acid, 2,3-dihydroxy benzoic acid and 5-hydroxyisophthalic acid.

4. The method of preparing a hyperbranched polyether ester according to claim 2, wherein the di-functionality haloalkane is selected from the group consisting of: 1,10-dibromodecane, 1,2-dibromoethane, 1,6-dibromohexane, 1,12-dibromododecane, 1,11-dibromoundecane, 1,9-dibromononane, 1,7-dibromoheptane, 1,8-dibromooctane, 1,5-dibromopentane, 1,4-dibromobutane, 1,3-dibromopropane, 1,10-dichlorodecane, 1,2-dichloroethane, 1,6-dichlorohexane, 1,12-dichlorododecane, 1,11-dichloroundecane, 1,9-dichlorononane, 1,7-dichloroheptane, 1,8-dichlorooctane, 1,5-dichloropentane, 1,4-dichlorobutane, and 1,3-dichloropropane.

5. The method of preparing a hyperbranched polyether ester according to claim 2, wherein the acid-binding agent is selected from the group consisting of: sodium carbonate, potassium carbonate and sodium hydroxide.

6. The method of preparing a hyperbranched polyether ester according to claim 2, wherein the solvent is selected from the group consisting of: 1,4-dioxane, tetrahydrofuran, N,N'-dimethylformamide, N,N'-dimethylacetamide and N-methyl-pyrrolidone.

7. The method of preparing a hyperbranched polyether ester according to claim 2, wherein the inorganic acid is selected from the group consisting of: hydrochloric acid, sulfuric acid and nitric acid.

8. The method of preparing a hyperbranched polyether ester according to claim 2, wherein the precipitant is selected from the group consisting of: deionized water, anhydrous diethyl ether, petroleum ether, ethanol and deionized water mixed in equal ratios, methanol and deionized water mixed in equal ratios, and diethyl ether and petroleum ether mixed in equal ratios.

9. The method of preparing a hyperbranched polyether ester according to claim 1, wherein the hyperbranched polyether ester is synthetized with a central core molecule in one pot, wherein the reactants further comprising a central "core molecule", wherein an amount of the central "core molecule" is 0.012-0.024 mol.

10. The method of preparing a hyperbranched polyether ester according to claim 9, wherein the central "core molecule" is selected from the group consisting of: 1,3,5-benzene tricarboxylic acid, phloroglucinol, 1,3,5-benzene trimethanol.

* * * * *